US009767615B2

United States Patent
Young et al.

(10) Patent No.: US 9,767,615 B2
(45) Date of Patent: Sep. 19, 2017

(54) SYSTEMS AND METHODS FOR CONTEXT BASED INFORMATION DELIVERY USING AUGMENTED REALITY

(71) Applicant: Raytheon Company, Waltham, MA (US)

(72) Inventors: Darrell L. Young, Falls Church, VA (US); Gregory R. Gondran, Heath, TX (US); Thomas G. Ribardo, Jr., Garland, TX (US); Mark A. Bigham, Heath, TX (US)

(73) Assignee: Raytheon Company, Waltham, MA (US)

( * ) Notice: Subject to any disclaimer, the term of this patent is extended or adjusted under 35 U.S.C. 154(b) by 176 days.

(21) Appl. No.: 14/692,290

(22) Filed: Apr. 21, 2015

(65) Prior Publication Data

US 2015/0310667 A1    Oct. 29, 2015

Related U.S. Application Data

(60) Provisional application No. 61/983,424, filed on Apr. 23, 2014.

(51) Int. Cl.
  *G06T 19/00*  (2011.01)
  *G06T 17/00*  (2006.01)
  (Continued)

(52) U.S. Cl.
  CPC ............ *G06T 19/006* (2013.01); *G06F 3/048* (2013.01); *G06F 17/30* (2013.01); *G06K 9/46* (2013.01);
  (Continued)

(58) Field of Classification Search
  None
  See application file for complete search history.

(56) References Cited

U.S. PATENT DOCUMENTS

| | | | |
|---|---|---|---|
| 8,532,367 B2 | 9/2013 | Kaganovich | |
| 8,682,037 B2 | 3/2014 | Crews | |

(Continued)

FOREIGN PATENT DOCUMENTS

| | | | |
|---|---|---|---|
| EP | 2442275 A3 | 4/2012 | |
| EP | 2597620 A2 | 5/2013 | |

(Continued)

OTHER PUBLICATIONS

"International Application Serial No. PCT/US2015/026874, International Search Report mailed Jul. 16, 2015", 5 pgs.

(Continued)

*Primary Examiner* — Yi Wang
(74) *Attorney, Agent, or Firm* — Schwegman Lundberg & Woessner, P.A.

(57) ABSTRACT

Generally discussed herein are systems, apparatuses, and methods for providing contextually relevant augmented reality (AR) to a wearable device. In one or more embodiments, a method can include extracting features of one or more objects in a location in a field of view of a camera of a wearable device, retrieving a three dimensional model of the location based on the extracted features, assessing a situation of a user associated with the wearable device, modifying the three dimensional model based on the assessed user situation, and presenting, using the wearable device, at least a portion of the modified three dimensional model.

17 Claims, 6 Drawing Sheets

(51) Int. Cl.
| | |
|---|---|
| G06T 7/00 | (2017.01) |
| G09G 5/00 | (2006.01) |
| G06K 9/46 | (2006.01) |
| G06F 17/30 | (2006.01) |
| G06F 3/048 | (2013.01) |
| G06T 7/70 | (2017.01) |

(52) U.S. Cl.
CPC ............... *G06T 7/70* (2017.01); *G06T 17/00* (2013.01); *G09G 5/003* (2013.01); *G09G 2370/02* (2013.01)

(56) References Cited

U.S. PATENT DOCUMENTS

| | | | |
|---|---|---|---|
| 8,811,720 | B2 | 8/2014 | Seida |
| 2009/0215533 | A1* | 8/2009 | Zalewski ............... A63F 13/00 463/32 |
| 2011/0216059 | A1 | 9/2011 | Espiritu et al. |
| 2012/0001938 | A1 | 1/2012 | Sandberg |
| 2013/0117377 | A1* | 5/2013 | Miller ...................... H04L 67/38 709/205 |
| 2014/0111511 | A1 | 4/2014 | Raif |
| 2014/0112536 | A1 | 4/2014 | Ely et al. |
| 2014/0112579 | A1 | 4/2014 | Verret |
| 2014/0340394 | A1* | 11/2014 | Mattila .................. G06T 7/0032 345/420 |
| 2015/0049080 | A1* | 2/2015 | Purayil ............... H04L 67/2847 345/419 |

FOREIGN PATENT DOCUMENTS

| | | |
|---|---|---|
| WO | WO-2011152764 A1 | 12/2011 |
| WO | WO-2015164373 A1 | 10/2015 |

OTHER PUBLICATIONS

"International Application Serial No. PCT/US2015/026874, Written Opinion mailed Jul. 16, 2015", 8 pgs.

Gausemeier, J, et al., "Development of a real time image based object recognition method for mobile AR-devices", Proceedings of the 2nd international conference on computer graphics, virtual reality, visualisation and interaction in Africa. Session: session G: image-based methods, Retrieved from the Internet: < URL: http://portal.acm.org/ci tati on.cfm? id=602355&jmp=ci t&dl =portal & dl=ACM>, (Jan. 1, 2003), 133-139.

Huang, Da-Yo, et al., "An application towards the combination of augment reality and mobile guidance", 2013 international conference on high performance computing & simulation (hpcs), IEEE, (Jul. 1, 2013), 627-630.

Takacs, G., et al., "Outdoors augmented reality on mobile phone using loxel-based visual feature organization", Proceeding of the 1st ACM International Conference on Multimedia Information Retrieval, (2008), 427-434.

Tanaka, K, et al., "An information layout method for an optical see-through head mounted display focusing on the viewability", Mixed and augmented reality, 2008. Ismar 2008. 7th IEEE/ACM international symposium on, IEEE, (Sep. 15, 2008), 139-142.

"Eye detection", Shiqi Yu's Homepage. [online]. [retrieved on Apr. 23, 2014]. Retrieved from the Internet: <URL: http://yushiqi.cn/research/eyedetection>, (2014), 2 pgs.

"Multinational Standardization of Live Training Solutions", US Department of the Army, STRI, PM Trade, Ministry of Defense, ITEC 2013, (2013), 15 pgs.

"OGC Augmented Reality Markup Language 2.0 (ARML 2.0)", (c) 2013 Open Geospatial Consortium [online]. [retrieved on Apr. 23, 2014]. Retrieved from the Internet: <URL: http://www.opengis.net/doc/arml2x0/2.0>, (Feb. 11, 2013), 78 pgs.

"Raytheon to begin Phase 3 on DARPA Persistent Close Air Support program", [online]. [retrieved on Apr. 23, 2014]. Retrieved from the Internet: <URL: http://raytheon.mediaroom.com/index.php?s=43&item=2513>, (Feb. 4, 2014), 2 pgs.

Bay, Herbert, et al., "Speeded-Up Robust Features (SURF)", Computer Vision and Image Understanding, 110(3), (2008), 346-359.

Bradski, Gary, et al., "Learning OpenCV: Computer Vision with the OpenCV Library", O'Reilly Media, Inc., Sebastopol, CA, (2008), 577 pgs.

Brown, Dennis G., et al., "Using Augmented Reality to Enhance Fire Support Team Training", Interservice/Industry Training, Simulation, and Education Conference (I/ITSEC) 2005, (2005), 1-9.

Castrillon, M., et al., "ENCARA2: Real-time detection of multiple faces at different resolutions in video streams", (2007), 130-140.

Dean, Frank S., et al., "Mixed Reality: A Tool for Integrating Live, Virtual & Constructive Domains to Support Training Transformation", Interservice/Industry Training, Simulation, and Education Conference (I/ITSEC) 2004, (2004), 8 pgs.

Kemper, Brian, "Live Training Standards Update", PM-TRADE, PEO-STRI. [online]. [retrieved on Apr. 23, 2014]. Retrieved from the Internet: <URL: https://www.It2portal.org/.../I_ITSEC_2010_Live_Training_Standards_B . . . >, (Nov. 30, 2010), 16 pgs.

Kruppa, H., et al., "Fast and Robust Face Finding via Local Context", Proceedings of the Joint IEEE International Workshop on Visual Surveillance and Performance Evaluation of Tracking and Surveillance, (2003), 157-164.

Lienhart, Rainer, et al., "Empirical Analysis of Detection Cascades of Boosted Classifiers for Rapid Object Detection", MRL Technical Report, Proceedings of the 25th DAGM Symposium on Pattern Recognition, (2003), 7 pgs.

Matas, J., et al., "Robust Wide Baseline Stereo from Maximally Stable Extremal Regions", Proceedings of British Machine Vision Conference (BMVC 2002), (2002), 384-396.

Nister, David, et al., "Linear Time Maximally Stable Extremal Regions", Lecture Notes in Computer Science. No. 5303, 10th European Conference on Computer Vision, (2008), 183-196.

Ojala, Timo, et al., "Multiresolution Gray-Scale and Rotation Invariant Texture Classification with Local Binary Patterns", IEEE Transactions on Pattern Analysis and Machine Analysis, 24(7), (Jul. 2002), 971-987.

Tsai, Tsung-Hung, et al., "Learning and Recognition of On-Premise Signs From Weakly Labeled Street View Images", IEEE Transactions on Image Processingm 23(3), (Mar. 2014), 1047-1059.

Viola, Paul, et al., "Rapid Object Detection using a Boosted Cascade of Simple Features", IEEE Conference on Computer Vision and Pattern Recognition (CVPR), (2001), 511-518.

"International Application Serial No. PCT/US2015/026874, International Preliminary Report on Patentability mailed Nov. 3, 2016", 9 pgs.

\* cited by examiner

SYSTEMS AND METHODS FOR CONTEXT BASED INFORMATION DELIVERY USING AUGMENTED REALITY

RELATED APPLICATION

This application claims priority to U.S. Provisional Application Ser. No. 61/983,424, filed Apr. 23, 2014, which is incorporated by reference herein in its entirety.

TECHNICAL FIELD

Embodiments discussed herein generally relate to mobile computing and augmented reality applications. One or more embodiments relate to augmenting image data to present to a user based on the determined user situation, such as by augmenting the image in different ways for different user situations.

BACKGROUND

Augmented reality (AR) applications have a wide variety of applications including use in repair and maintenance, navigation, entertainment, and/or hospitality and tourism, among others. Augmented reality generally includes adding an augmentation object to an image or modifying an object in an image of a real world location. The augmentation object can include text, a graphic, symbol, image, and/or a combination thereof, among others.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to providing information to a user based on a determined user situation. One or more embodiments relate more specifically to augmenting an image presented to a user based on the determined user situation, such as can include augmenting the image in different ways for different user situations. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current state of the art of mobile computing can be improved by improving ease-of-use. Users cannot seamlessly interact with their smart phone to receive graphical or textual information about their surroundings without either looking down, which can be dangerous, or holding their smart phone up, which can be tiring and/or socially uncomfortable.

Heads-up wearable technology (technology that allows a user to use it while keeping their head up), such as smart glasses or a smart visor, offers a potential solution but can benefit from new ways of user experience or interaction.

Augmented Reality (AR) attempts to recognize in-scene features, such as Quick Response (QR) codes, or use location information to inject text or graphics. However, attempts to date have drawbacks that make them not workable in some situations. Smooth user interaction with resulting positive user experience has proven elusive.

Figure 1:
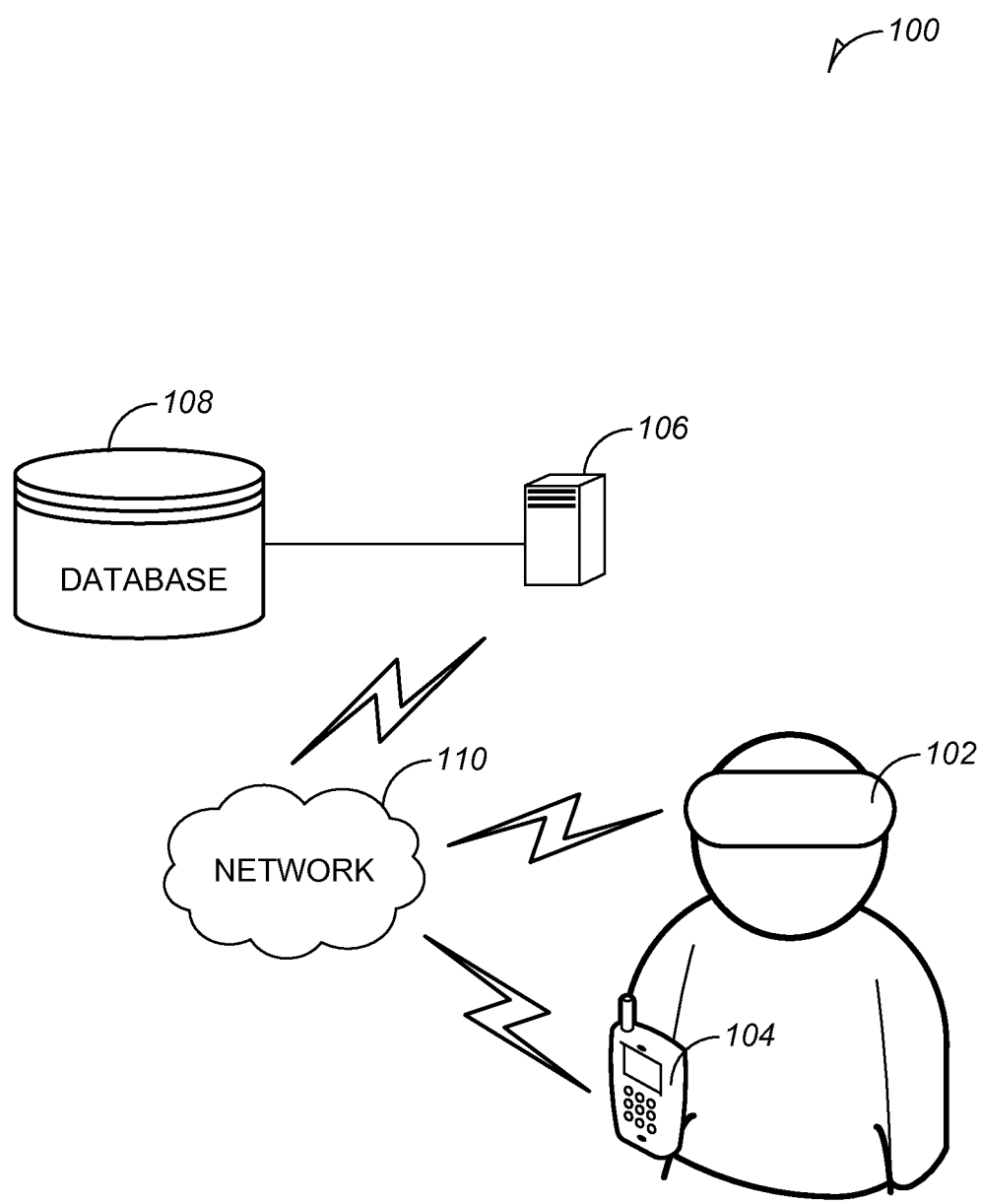
FIG. 1 illustrates, by way of example, a block diagram of an augmented reality (AR) system, in accord with one or more embodiments.

FIG. 1 illustrates, by way of example, a block diagram of an embodiment of an AR system 100. The system 100 as illustrated includes a wearable device 102, a smart phone 104, a server 106, and a database 108. The wearable device 102, smart phone 104, and the server 106 can be communicatively coupled through the network 110.

The wearable device 102 can include a pair of smart glasses or a smart visor or band, such as Google Glass, or other device that includes a display capable of producing an Augmented Reality (AR) image in a heads up device.

The smart phone 104 can include a cellular telephone, tablet, Personal Digital Assistant (PDA), smart reader, laptop, or other device capable of being coupled to the network 110. The smart phone 104 can include a Global Positioning Systems (GPS) application (e.g., a location module), such as can provide a location of the smart phone 104 (e.g., the location of the user) to a device connected to the network 110. The location can be used by the server 106, smart phone 104, or the wearable device 102. The server 106, smart phone 104, or the wearable device 102 can access a 3D model of the location or a feature near of the user in the database 108. The server 106 can access a 3D model of the location or object in the field of view or near the user based on satellite or other images of the location of interest, such as can be accessed through the network 110 or the database 108.

Figure 2:
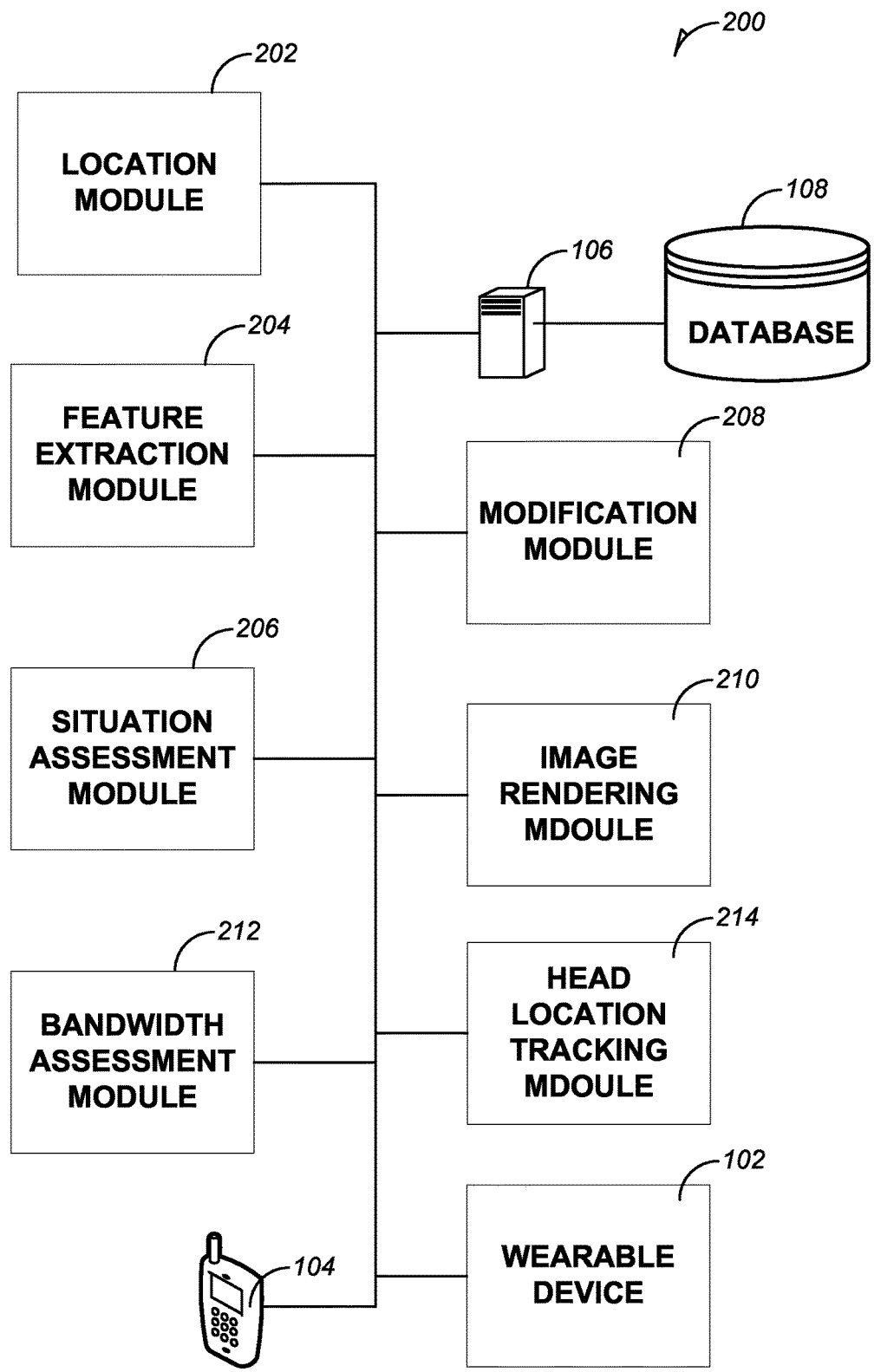
FIG. 2 illustrates, by way of example, a block diagram of a system for providing content to a wearable device of a user, in accord with one or more embodiments.

The system 100 can include a situation assessment module (see FIG. 2). The situation assessment module can consider a user's past behavior patterns, time of day, day of week, time of year, or personal interests to determine what is most relevant to that user at a particular location, direction of travel, or time. The users past behavior can include buying habits, locations the user has visited, browsing or search history using an item of the system, or other behavior of the user.

The server 106, wearable device 102, or the smart phone 104 can determine one or more content items at or near the location of the user that can be of interest to the user. The content item(s) can be presented to the user as AR objects superimposed on an image that is being presented to the user through the wearable device 102. The content items can include locations of stores or other objects of interest.

Objects of interest that can be associated with a content item (e.g., an AR object) can include people, street names, views provided by cameras that provide a field of view different from the user's field of view (e.g., a field of view that is occluded to the user), a product offer from a vendor (e.g., a coupon or discount offer), or other potential objects of interest.

An example of a feature that can be presented to the user can include a field of view of a camera that is mounted on a stoplight, building, sign, or other object near the user. In this fashion, a user can see, for example, if they can safely proceed in the direction they are heading, such as without contacting an object that is present in an occluded portion of their view. In another example, a camera can help a user see around a wall, such as in a law enforcement or military operations live or training situation. An item stored in the database 108 can include an area on which an AR object can be projected without obscuring the view of the location to the user. Such items can include billboard, building, sidewalk, street pavement, sky, artificial or real ceiling, or other feature on which an AR object could be displayed, such as a generally flat surface.

The server 106, wearable device 102, or the smart phone 104 can insert an AR object on or near the one or more objects of interest. The AR object can include an icon that indicates clearly what it represents. The icon can include an arrow indicating a direction for the user to travel, a circle or arrow indicating where an object of interest is located, text describing the feature, prompting the user to perform an action or asking the user a question, a symbol representing an occluded object, such as a person, sign, or other object, a coupon or other discount, a warning that an object is approaching, and/or other AR objects.

The AR object can be added to the image viewed by the user based on a user situation. The user situation can include one of at the following categories: 1) orientation; 2) browsing; 3) tasked search; or 4) guidance.

Different quantities of and/or different AR objects can be inserted into the image being viewed by a user based on the determined user situation. For example, determining a user situation can include determining a speed, a location, or an action being performed by a user. If a user is moving slow, more AR objects can be displayed on the image the user is viewing as compared to a user that is moving fast (e.g., driving as compared to walking). If a user is determined to be crossing a street, or performing an action that requires more of the user's attention, fewer AR objects can be displayed on the image. In one or more examples, fewer AR objects can be displayed to a user that is determined to be in an orientation situation than can be displayed when a user is determined to be in a browsing situation. Similarly, more AR objects can be displayed in response to determining a user is in a guidance situation as compared to a search or browsing situation. In one or more examples, more AR objects can be displayed when a user is determined to be off a guided path then when a user is determined to be on a guided path The network 110 can be coupled to one or more social media databases or other databases that indicate the location of a person at a particular time. The system 100 can use this data to help a user find a person. If a person does not want to be found, they can indicate this by selecting a setting. Alternatively, the system can be set up to default so that a person's location is confidential unless they select an option that allows others to view their location.

FIG. 2 illustrates, by way of example, an embodiment of a system 200 for providing content to the wearable device 102 of a user. The system 100 as illustrated includes the wearable device 102, the smart phone 104, the server 106, the database 108, a location module 202, a feature extraction module 204, a situation assessment module 206, a modification module 208, a bandwidth assessment module 212, an image rendering module 210, and/or a head location and tracking module 214. The location module 202, feature extraction module 204, situation assessment module 206, modification module 208, bandwidth assessment module 212, image rendering module 210, and/or head location and tracking module 214 can be implemented in one or more of the wearable device 102, the smart phone 104, and the application server 106.

The location module 202 determines a location of a user. The location module 202 can use a Global Positioning System (GPS), triangulation, or other technique to estimate the location of the user. Triangulation can include determining how long a signal from the smart phone 104 or the wearable device 102 takes to get to each of a plurality of access points (APs) and/or base stations and using the time of flight of the signals to estimate the user's location (e.g., the location of the smart phone 104 or the wearable device 102, which can be assumed to be the location of the user).

The feature extraction module 204 takes image data as an input and determines potential features based on the image data. A feature can include an edge, an outline of an object, a wire frame of an object, image data of an object, or other feature. The feature extraction module 204 can implement an edge detection technique, such as search-based edge detection or a zero-crossing based edge detection technique. A noise reduction technique can be applied to an image prior to edge detection, such as Gaussian smoothing. Some more specific edge detection techniques include Canny edge detection, differential edge detection, or phase congruency based edge detection.

A wire frame of an object can be created by connecting edges of an object with a straight or a curved line. An outline of an object can be created by only keeping the perimeter edges and connecting them with straight or curved lines or by creating a wire frame and removing any lines internal to the perimeter of the object. The image data of an object can be gathered by creating an outline or a wire frame and passing just the pixels within and/or on the wireframe or outline.

The features extracted by the feature extraction module 204 and/or the location of the user from the location module 202 can be provided to the server 106. The server 106, the smart phone 104, or the wearable device 102 can locate a three dimensional model of the features provided by the feature extraction module 204, such as can be based on the location of the user. The three dimensional (3D) models can be pre-computed and stored in the database 108. The 3D models can be indexed by location and/or one or more features, such that the server 106, smart phone 104, or the wearable device 102 can match a feature to another feature near the location of the user.

The orientation of the user relative to a feature extracted by the feature extraction module 204 may be different than the orientation of the feature in the 3D model in the database 108. The database 108 can include orientation data that the server 106, smart phone 104, or the wearable device (e.g., the modification module 208) can use to orient the feature received from the feature extraction module 204 to the orientation of the feature in the database 108 or vice versa (i.e. orient the feature from the database 108 to about the same orientation as the feature from the feature extraction module 204). Other methods can be used to orient the feature from the database 108 and the feature extraction module 204 to about the same orientation so as to allow a comparison of the features, such as by adjusting both orientations to match a pre-specified orientation. The orientation of the user can be determined by the head location and tracking module 214. The server 106 can return the 3D model of the object(s) determined to be associated with the features from the feature extraction module and provide the object(s) to the modification module 208.

The situation assessment module 206 determines a situation in which a user is currently engaged. The situation can include one of the following situations: determining an orientation (relative to an object), browsing, tasked search, or guidance mode (e.g., navigation to an object), among others. The situation assessment module 206 can monitor a user's action(s), receive an indication from the user performing a gesture or otherwise selecting a mode of operation, such as through the smart phone 104 or the wearable device 102, or a combination thereof to determine a user's situation. The modification module 208 uses the situation provided by the situation assessment module 206 to determine how much and/or what AR objects to add to an image (e.g., a 3D model of a location). A situation can include fly and jump modes (described below).

The situation assessment module 206 can determine a user is in a browsing situation by detecting that a user has conducted a general search for general knowledge of their surrounding using the wearable device 102 or the smart phone 104, or the user indicating verbally, by performing a gesture, or activating a control on a touch screen or other display, that the user is in a browsing situation. The situation assessment module 206 can determine a user is in a tasked search situation by detecting that a user has conducted a search for specific information regarding a specific object using the wearable device 102 or the smart phone 104, or the user indicating verbally, by performing a gesture, or activating a control on a touch screen or other display, that the user is in a tasked search situation. The situation assessment module 206 can determine a user is in an orientation situation by detecting that a user has conducted a location search (e.g., "where am I" or where is [specific object]") using the wearable device 102 or the smart phone 104, or the user indicating verbally, by performing a gesture, or activating a control on a touch screen or other display, that the user is in an orientation situation. The situation assessment module 206 can determine a user is in a guidance situation by detecting that a user has conducted a directions search (e.g., "how do I get to [specific location]?", "directions to [specification object]", or the like) using the wearable device 102 or the smart phone 104, or the user indicating verbally, by performing a gesture, or activating a control on a touch screen or other display, that the user is in a browsing situation.

In browsing mode, the modification module 208 can add one or more AR objects to image data that provide information regarding objects in the field of view of a camera on the wearable device 102. The information can be content provided by stores and other contributors. Display of information can be controlled by constraining the initial display to be near the premises of the associated object, such as on a blank or generally featureless portion of an object or near the associated object. Browsing can include determining, by the situation assessment module 206 that the user is looking for general information about the location. Browsing can be indicated by a user performing a general search on the location or searching for a location that provides general information about an area, such as a chamber of commerce or visitor's center, such as by using the wearable device 102 or the smart phone 104. The AR object(s) presented to the user when it is determined that the user is in a browsing situation can include general information about the location, a famous landmark, a name of a store or building in the field of view, a name of a street, river, mountain, or other geographic point of interest, among others.

In the tasked search mode, the modification module 208 can add one or more AR objects to image data that is user requested. A tasked search can include a user searching for specific information, such as a time of an event, a person, a list of stores to visit that the user can choose from, history or other information about a specific object or area in or near the location. The features presented to the user (e.g., as AR objects) when it is determined that the user is in a tasked search situation can include directions, text (e.g., an address, review, product information, or the like), an image of a flyer or other promotional material(s), or other specific information related to the search the user performed.

In the guidance mode, the modification module 208 can provide synthetic directions blended into the natural image data (e.g., an arrow, a track, a symbol, or a combination thereof) that indicates a route the user can travel to reach a destination object. Monitoring of user's progress towards the destination object can be used as part of the feedback used to control the amount and/or types of AR objects that are presented. For example, if a user is off track, an AR object can change color, flash, or can be changed to a different object to indicate to a user that they are off track. Additional AR objects can be added to the image data to indicate that the user is off track, such as a message indicating that the user is off route.

In the orientation mode, the modification module 208 can include AR objects indicating to the user their current location (e.g., country, state, city, province, county, street, address, zip code, latitude/longitude, or the like) or where a known object is located relative to the user. In this user situation, a user may have just arrived at the location (e.g., a location they are not familiar with or have not been detected in before), or are looking around trying to orient themselves in the location, such as relative to an object of interest or other object.

The AR object(s) can be projected onto (e.g., situated over) image data corresponding to a pre-computed AR object location, such as can be stored in the database 108 and related to an object or location. The pre-computed AR object location can be an area in the location, near the object it is associated with, on which an AR object can be projected without obscuring the view of the object. The pre-computed object location can include a generally flat, and/or generally open space portion of an image (e.g., a generally featureless portion of the image). The AR object locations can include regions determined to be generally flat and/or featureless (featureless in terms of edges or other features that can be extracted, such as by using the feature extraction module 204), such as can be determined using maximally stable extrema regions (MSER), Viola-Jones, and/or SURF to pre-compute, store on the database 108, and related to an object and/or location.

The image rendering module 210 produces an augmented image to be presented to the user by the wearable device 102. The image rendering module 210 combines image data, such as from the camera on the wearable device 102 or the smart phone 104, 3D model data from the server 106, and/or AR object data to create an image to be presented by the wearable device 102.

The bandwidth assessment module 212 analyzes the current compute bandwidth being used by the server 106, smart phone 104, and the wearable device 102 relative to the total compute bandwidth available from the server 106, smart phone 104, and the wearable device 102, respectively. The compute bandwidth of a device can be a function of a number of processors on the device, the speed of the processors, the architecture of the processors, or the like. The bandwidth assessment module 212 assigns tasks to be performed by the modules (e.g., the location module 202, the feature extraction module 204, the situation assessment module 206, the modification module 208, the HLT module 214, and/or the image rendering module 210) to a device (e.g., the wearable device 102, the smart phone 104, and/or the server 106) based on the determined bandwidth and the amount of computation bandwidth required to perform an operation. For example, if the server 106 has a bandwidth to perform an operation in a short amount of time (a few seconds or less) and the wearable device 102 and the smart phone 104 do not have such bandwidth, the operation can be assigned to the server 106. Another consideration in making an assignment includes time it takes to provide results or data to the wearable device 102. For example, consider a situation where the server 106 can perform an operation marginally faster than the smart phone 104, but the time it takes the server 106 to transmit the results to the wearable device 102 is more than marginally greater than the time it takes the smart phone 104 to transmit the results to the wearable device 102. It can be faster overall to have the smart phone 104 perform the operation. An operation can be performed by more than one of the devices as long as the operation is parallelizable.

Fly and jump modes can be entered automatically (e.g., in response to the situation assessment module 206 determining the user is in a specified situation) or can be user initiated. The fly mode includes a bird's eye view of the location of the user that can be retrieved from the database 108 and produced using an aerial vehicle, such as a drone, plane, helicopter, satellite, or other aerial vehicle. Jump mode includes a street view of the current location of the user.

The head location and tracking (HLT) module 214 can determine a location and orientation of a user's head. The HLT module 214 can use a location, such as from the smart phone 104 to locate the user in space. Video data from the user's wearable device 102 can be used with the location information from the smart phone 104 to determine the orientation of the user's head (e.g., relative to north or some other direction). This orientation information can be used to help orient a model of an object in the database to about the same orientation of the object relative to the user.

Figure 3:
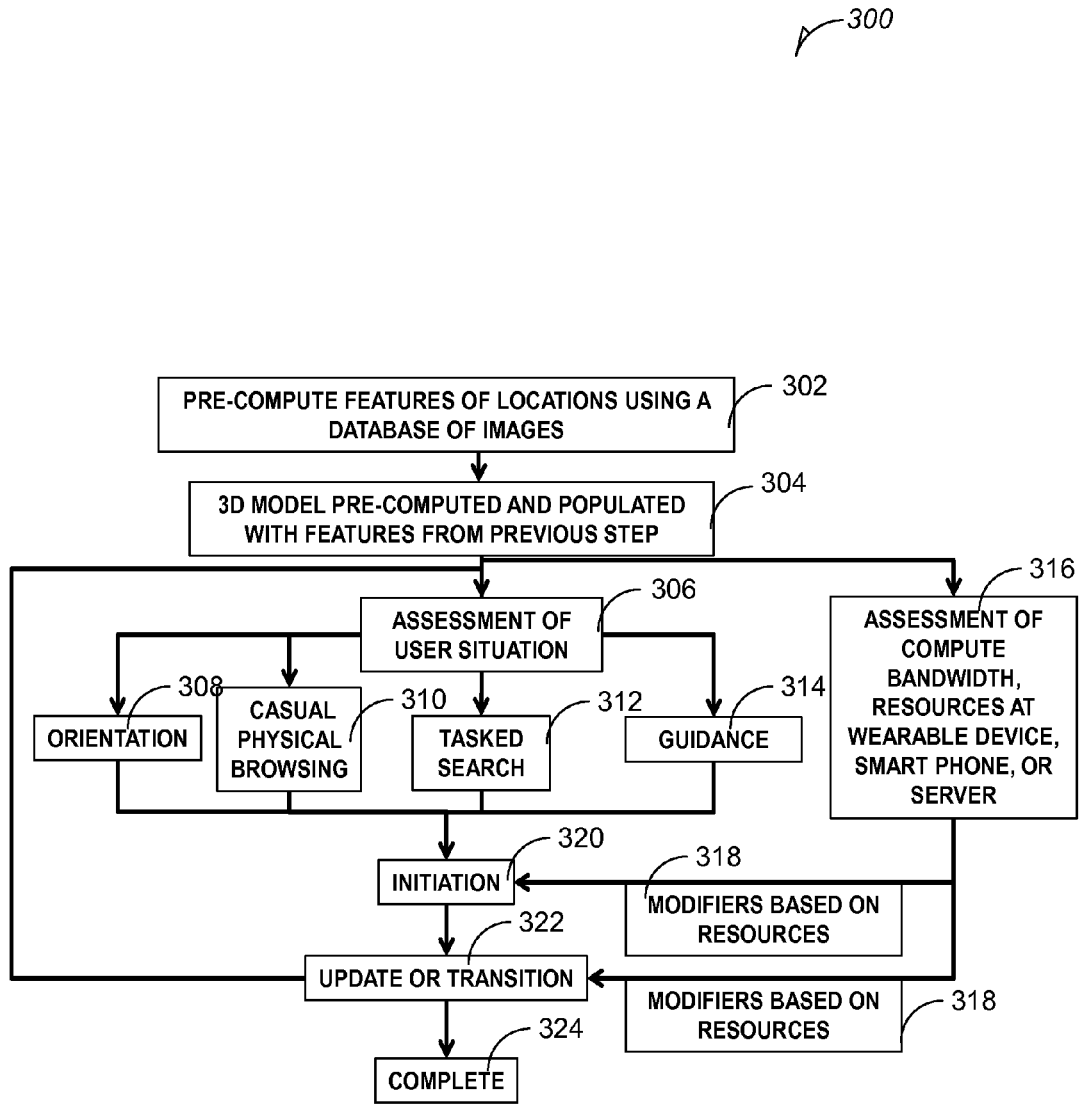
FIG. 3 illustrates, by way of example, a flow diagram of a method for AR, in accord with one or more embodiments.

FIG. 3 illustrates, by way of example, a flow diagram of an embodiment of a method 300 for AR. The method 300 as illustrated includes: at operation 302, computing (e.g., pre-computing) features of objects of locations using a database of images of the location, such as by using the feature extraction module 302; at operation 304, a three-dimensional (3D) model of the location or object can be pre-computed or populated with one or more of the pre-computed features; at operation 306, an assessment of a user situation can be made, such as to determine if the user is in an orientation situation (at operation 308), a browsing situation (at operation 310), a tasked search (at operation 312), or a guidance situation (at operation 314), such as by using the situation assessment module 206; at operation 316, an assessment of computing bandwidth and resources available at the wearable device 102, smart phone 104, and/or server 106 can be determined, such as by using the bandwidth assessment module 212; at operation 318, modifiers (e.g., AR objects) to the 3D model can be provided to the operation 320 or 322, such as by using the modification module 208; at operation 320, a process of modifying the 3D model, such as by using the modification module 208 can be initiated; at operation 322, the 3D model can be updated or transitioned based on the modifiers; at operation 324, the method can end.

The operation at 316 can include delegating computer program calculations or operations to the smart phone 104, the wearable device 102, or the server 106 based on the available bandwidth or resources. For example, if the smart phone 104 is determined to have a lot of available bandwidth, the calculations or operations of the program can be delegated to the smart phone 104.

The operation at 322 can include switching a view of the 3D model from jump mode to a fly mode, or vice versa. A fly mode view can include a bird's eye view of the location while a jump mode view can provide a street view of the location.

Figure 4A:
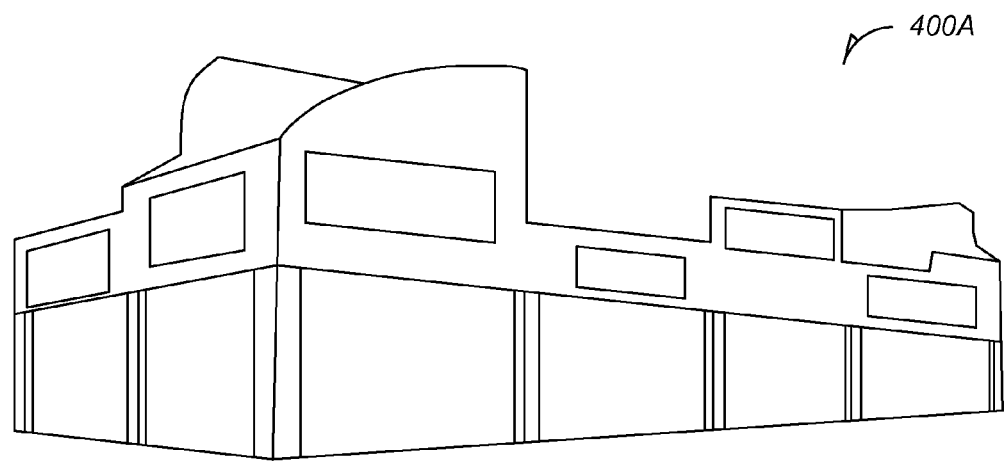
FIGS. 4A, 4B, and 4C illustrate, by way of example, block diagrams of a method of extracting a wireframe and populating a 3D model with AR objects, in accord with one or more embodiments.
Figure 4B:
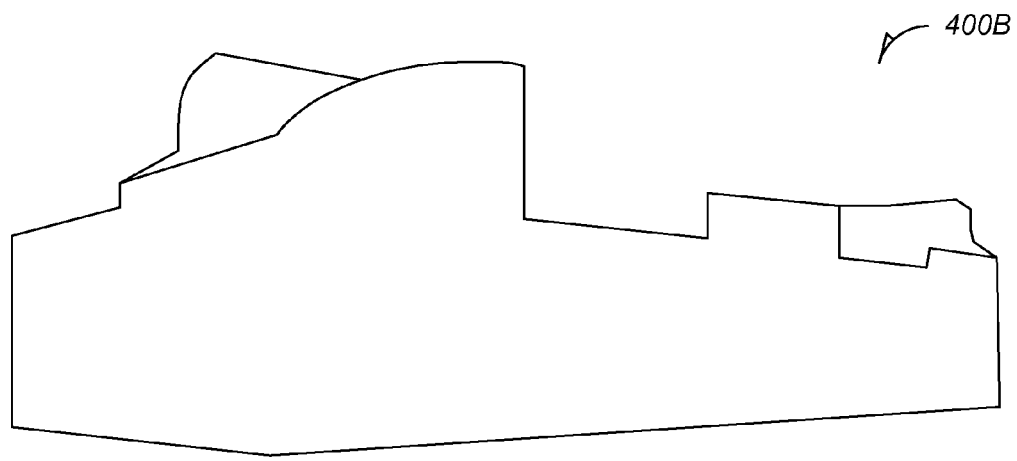
Figure 4C:
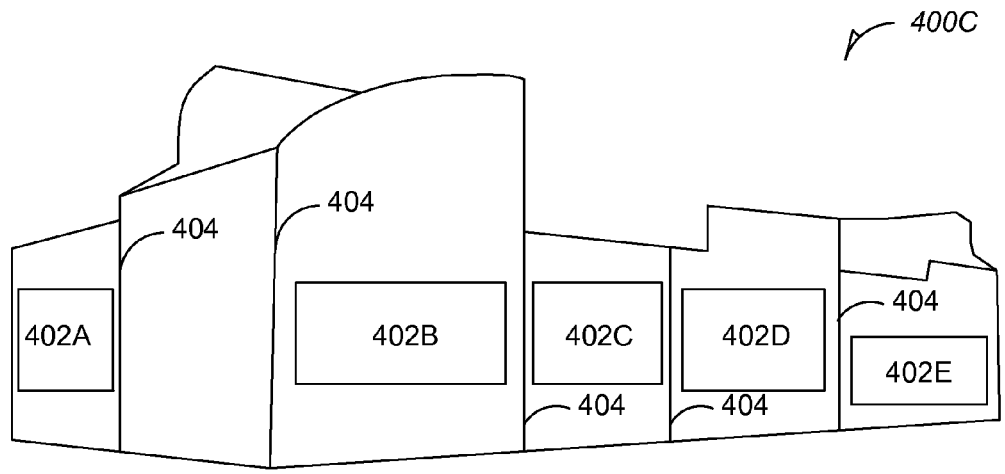

FIGS. 4A, 4B, and 4C illustrate, by way of example, an embodiment of extracting a wireframe and populating a 3D model with AR objects. FIG. 4A illustrates an example of an image 400A of a shopping center. FIG. 4B illustrates an example of a wire frame 400B of the shopping center in the image 400A, such as can be created by the feature extraction module 204. FIG. 4C illustrates an example of content 402A, 402B, 402C, 402D, and 402E (e.g., AR objects) situated on the wire frame 400B to produce the 4D content 400C. The 4D content 400C also includes lines 404 added to the wire frame 400B to help a user distinguish between businesses, for example.

In one or more embodiments, to help overcome one or more of the issues with prior technology, an apparatus can pre-compute one or more features of a location using one or more images of the location. Features can include Viola-Jones style templates for signs, Speed-Up-Robust Features (SURF) for signs and surrounding areas that are suitable for information insertion. Maximally Stable Extrema Point Regions (MSER) can be cataloged to help recognize objects and locations in the environment. A 3D model can be constructed and updated based on prior information available from 3D point cloud data. The 3D model can be stored on the database 108.

In one or more embodiments, a precise (e.g., an accurate and high resolution) 3D model of an area of interest can be created by combining multiple images from satellites and/or other sources, and generating a 3D point cloud using the images. A geometric bundle adjustment technique can be used to produce a normalized model of imagery with other geometric information, such as to create a geo-registered self-consistent base. Automatic image blending and/or correlation to image data can then create a "colorized" 3D image with or without one or more augmentation objects. Calibrated street level imagery (such as from Google Street View) may also be integrated. This process can provide a very accurate foundation for content and other data that can be presented to a user.

Creating a 3D model can include operating on a plurality of images (e.g., Light Detection and Ranging (LIDAR), electro-optical (EO), or other image) that include multiple views of the same scene, typically from slightly different viewing angles and/or lighting conditions. The 3D model can be created by using image date (and optionally sun geometry) associated with the image. In some examples, a 3D surface model can be created from a 3D data set. The 3D surface model establishes a local surface orientation at each point in the 3D data set. A surface shaded relief (SSR) can be produced from the local surface orientation, from an image, and from sun geometry associated with the image. Points in the SSR that are in shadows can be shaded appropriately. The SSR can be projected into the image plane of the image. Edge-based registration can extract tie points from the projected SSR. The 3D data set can be used to convert the tie points to ground control points. A geometric bundle adjustment can be used to align the image geometry to the 3D data set.

One of the images can be selected as a reference image. For each image ray in a non-reference image, a local region from the non-reference image's space to the reference image's space can be resampled. The resampling can be performed multiple times, each time with a different surface orientation hypothesis. A cross-correlation can be performed on the resampled images and correlation scores can be evaluated, and a surface orientation hypothesis associated with the highest correlation score can be selected. The peak of the correlation surface can be projected back through a geometry model for the selected surface orientation hypothesis to determine a three-dimensional (ground) location for the image ray.

A 3D model can also be created from a video stream, such as by obtaining a video stream of a scene by a first camera, locating a horizon with respect to the scene with a second camera, and constructing a three-dimensional model of the scene based upon the obtained video stream and the located horizon In one or more embodiments, content can be gathered and associated with a feature of an object in a 3D model, such as by storing the content on and indexing the content, feature, object, and/or 3D model on a relational database (e.g., the database 108). Content can include business names, addresses, phone numbers, email address/email, promotional material, and/or coupon, for the area of interest, among others. Content can be matched to a user to help ensure that it is relevant to the user, such as by directly asking the user one or more questions, analyzing a profile of the user on a social networking cite, analyzing the user's browsing history, or indirectly, such as by monitoring a user's purchase history, browsing history, call history, or other actions and inferring content that might be of interest to the user.

In one or more embodiments, the content can be registered to the 3D model, creating precisely registered "4D content". Portions of the 4D model (e.g., a wireframe) can be sent to a wearable device in the same general vicinity as the location of the model. The wireframe can be at least partially populated (e.g., "filled in") by image data from a camera of the wearable device or from the pre-computed 3D model data.

In one or more embodiments, a method or system for constructing a 3D wireframe can include acquiring a first camera frame at a first camera position, extracting image features from the first camera frame, and initializing a first set of 3D points from the extracted image features. Creating the wireframe can include acquiring a second camera frame at a second camera position, predicting a second set of 3D points by converting their positions and variances to the second camera position, and projecting the predicted 3D positions to an image plane of the second camera to obtain 2D predictions of the image features. An innovation of the predicted 2D image features can be measured and estimates of 3D points can be updated based on the measured innovation to reconstruct scene features of the object image in 3D space.

The 4D content (3D content with content, such as one or more augmentation objects) can be provided to a user based on the user situation. The situation assessment module 206 (see FIG. 2) can determine relevance of content, such as by comparing a user's past behavior (e.g., locations the user has visited, past buying habits, browsing history, or other actions) with their current location, time of day, day of the week and/or other environmental data. The situation assessment module 206 can monitor the current location, direction of travel for each user, time of day, habits of the user, or the like and determine what content may be relevant to that user at that time. Optionally, a module or device of the system 200 can accept relevance inputs from external inputs, such as a website. The situation assessment module 206 can determine a user's current situation to determine what type of content and/or how much content to add to the 3D model for presentation to the user.

In one or more embodiments, the location and orientation of a user's head can be tracked, such as by the HLT module 214. The HLT module 214 can use a location, such as from the location module 202 to locate the user in space. Video data from the user's wearable device 102 can be used with the location information to determine the orientation of the user (e.g., relative to true north). The 4D content can be oriented, such as by the modification module 208, to match the orientation of the corresponding object in the user's field of view (i.e. to match the orientation of the object as viewed from the user's perspective).

In one or more embodiments, systems and methods discussed herein can provide a service to businesses that desire increased visibility, business, and/or patronage. Those businesses can attach a detectable marker above their main entrance or primary signage as 4D content. The HLT application can use those markers to further refine user location and head orientation. The businesses or other entities can provide digital coupons and other services as AR objects projected on the image data provided to the user's wearable device.

In one or more embodiments, the database 108 can include pre-computed templates (features), sign features, and/or associated nearby areas most suitable for information projection. Locations most suitable for information projection can include sidewalks, walls, doors, windows, ceilings, sides of vehicles, blank sections of buildings (e.g., portions of a buildings without signage or a display, such as generally featureless regions of an object).

In one or more embodiments, fly and jump modes can allow user to gain a sense of orientation. Insertion of text or graphics into live heads up video stream can be combined with control via movement of smart phone and other gestures to aid in determining if a user desires more or less information (AR objects) presented. The system can use a Viola-Jones type cascade detector for fast detection of sign type followed by SURF type feature matching for specific sign identification and localization (e.g., location determination). The systems, devices, and methods can allocate processing between server, smart phone, and wearable device. The system can automatically select a perspective to inject information overlays in live video combined with correlated tactile and auditory indicators. Communication and control can be accomplished using movement of smart phone or screen swipes, taps, and/or auditory cues.

One or more embodiments can include recognition of places and/or faces using location and/or a compass, such as to narrow possibilities for a user. A "find friend" feature can take location from a friend's smart phone or other locality data store and search for a face in the direction of the smart phone, such as by using viewshed, to predict when a face can be in view. Actions to prevent use of recognized places or faces based on subscription based blacklist that can be configured based on who, when, and/or where.

Some improvements on current technology provided by the present disclosure can include fly and jump modes to help a user in determining their orientation, insertion of text, graphics, and video with perspective, detection of orientation to determine nearby areas most suitable for information projection such as sidewalks, walls, doors, windows, ceilings, or sides of vehicles. Communication via swipes, taps, jogs, or other gestures can help in providing a more seamless user experience. Guiding user via projected arrows, sounds, or vibrations can help a user experience in getting directions or navigating to an object. Recognition of places and faces using location and compass to narrow possibilities for a user. Actions to prevent use of recognized places or faces based on subscription based blacklist that can be configured based on who, when, and where. Use of Viola-Jones type cascade detector followed by SURF type feature matching to help in determining a location to project an AR object or determine a location or orientation of a user. A smart allocation of processing between server, smart phone, and wearable device can be managed.

One or more advantages of systems, devices, and methods discussed herein can include providing accurate 3D models that can be accessed and viewed quickly. This includes accurate 3D models of areas that may be difficult to access or photograph. The 3D models can become the foundation for creating an AR experience for customers and new revenue streams for businesses. The systems, devices, and methods can provide an accurate registration of content (e.g., signage, digital coupons, or other AR objects). Another advantage can include an efficient method of serving content to wearable or mobile devices, such as through a "light weight" (i.e. low computational complexity) application to accurately register content on a user's wearable device. Another advantage can include an architecture that is scalable by adding content and 3D models of locations offline to be relevant to more users, such as to provide precise, high resolution 3D models of an area. Another advantage can include increased proximity based advertising revenue from mobile platforms and developers or businesses. Yet another advantage can include flexibility, such that the system can work with a commercial space or other imagery source.

These devices, systems, and methods have application in many industries including, but not limited to: 1) proximity based advertising, 2) law enforcement, 3) emergency services, 4) insurance, 5) retail sales, 6) military operations, and many other areas. Reference will now be made to the FIGS. to further describe details of the present disclosure.

Generally, the systems, devices, and methods discussed herein can combine pre-computed 3D models and AR, such as to help wearable device wearers better understand their local environment. Accurately displaying contextual information on the wearable device can help consumers find businesses, street names, addresses, emergency services, landmarks, and other important infrastructure. An example use case includes augmenting image data to include an AR object that is a digital coupon for a product or service provided by a business in the field of view being presented to the user, such as to help entice the user to frequent the business.

A metric of quality of an AR system is how accurately it integrates augmentations with the real world. One or more advantages of the devices, systems, and methods can include: 1) Precisely registering image data to a very accurate 3D model; 2) Displaying only the most relevant AR objects to a user; and/or 3) Accurately displaying AR objects from the user's point of view. The system can do this by creating a very accurate 3D model of the real world, precisely registering content to that 3D model, and tracking the orientation of the user relative to an object or feature in the location.

Some example use cases are presented to demonstrate benefits of AR for live training and battlefield situational awareness and control. Some potential benefits of AR on the training range and the battlefield has been recognized for at least a decade. AR has a number of use cases. In training, it can assist range controllers in maintaining situational awareness, which can increase safety of soldiers. Soldiers can be presented virtual threats to improve training effectiveness at reduced cost. On the battlefield, soldiers can be shown zones safe from enemy fire, useful for wireless connection, or potentially dangerous, based on past incidents.

Commanders can use AR to insert virtual commands to direct troops with easy-to-follow visual instructions. AR can help coordinate indirect fires and close-air-support. AR can be used to enhance air-ground interactions such as delivery of supplies, reconnaissance, and/or surveillance, among others.

Range/exercise controllers benefit from real time situational awareness in order to most effectively execute the training scenario. AR offers heads-up visualization of where the players are in a non-obtrusive presentation that enables better execution of the training script. Soldiers can receive improved training when incorporating AR that inserts smart targets that respond. This more fully tests soldiers' ability to correctly react to situations of interest. Soldiers on the battlefield can benefit from knowing where they can be safe from enemy fire, where they can maintain communications, and/or where they can visually observe the enemy. These are often conflicting goals, but AR can dynamically visualize each of these zones in a semitransparent way that does not interfere with normal viewing of the environment. Individuals can be directed to perform synchronized actions using AR visual instructions. This enables a new level of command and control.

A "See Through the Wall" video feed can be rotated to the soldier's perspective and/or displayed using AR to give an interior view of activity by rendering the wall transparent or semi-transparent. The same technique can be used to enable soldiers to "see through" buildings or around corners giving superior situational awareness.

Figure 5:
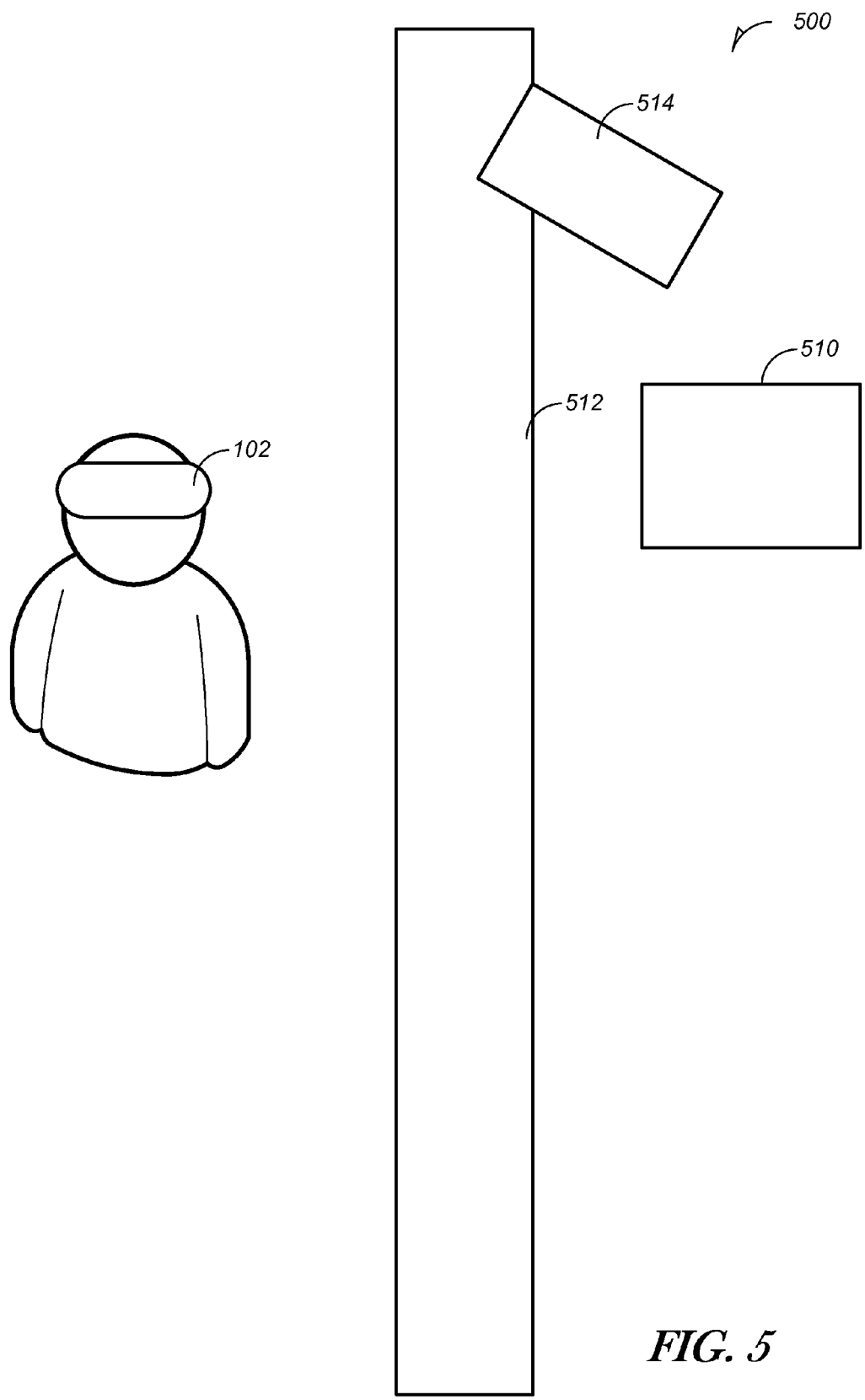
FIG. 5 illustrates, by way of example, a block diagram of a system to help increase a user's situational awareness, in accord with one or more embodiments.

FIG. 5 illustrates, by way of example, a block diagram of an embodiment of a system 500 to help enhance a user's situational awareness. The system 500 as illustrated includes a user wearing the wearable device 102 where the user cannot view a target 510 because the target 510 is occluded to the user's perspective by an object (e.g., a wall 512 as in the example of FIG. 5). The camera 514 can be communicatively coupled to each other through the network 110 (not shown in FIG. 5, see FIG. 1). Image data from the camera 514 can be oriented and/or rendered, such as by the image rendering module 210 and displayed to the user through the wearable device 102. The image data can be oriented in a direction the user would see the scene if the wall 512 were not occluding the view (such as by a module of the server 106, the smart phone 104, the wearable device 102). The AR can enable visualization of indirect fires similar to "See Through the Wall" technique described with regard to FIG. 5.

Traditional mouse, keyboard, and/or touchscreen interactions can defeat one or more of the advantages of a head-up system, and voice control is not possible for some applications of AR, such as soldiers attempting covert operations. Gesture control may be a solution, but cluttering the display with control elements can hinder information conveyance, occlude the field of view presented to the user, and/or complicate the process such that a user inadvertently sends a command to the wearable device 102 that was not meant to be sent.

One solution is to provide a user with the ability to turn on/off the AR information. In another example solution, the AR information display can be configured pre-mission. Yet another solution can include having the commander select the AR mode each team or soldier is to have. Other alternatives are for the AR modes to be available based on nearby peer settings. In some cases, the system can automatically determine that a certain mode is appropriate. For example, for troops in contact, a semi-transparent display of potential fire zones could be automatically displayed. Certain AR modes could be automatically instigated based on a message received at the wearable device 102. AR has the potential to enable a soldier to quickly access After Action Review (AAR). In some cases, it may be possible to integrate AAR with Embedded Training (ET) to facilitate learning and improve future outcomes.

Certain embodiments are described herein as including processing circuitry (e.g., an arithmetic logic unit (ALU), transistor, resistor, inductor, capacitor, multiplexer, logic gate, central processing unit (CPU), or the like) or a number of components, modules, or mechanisms. Modules may constitute either software modules (e.g., code embodied (1) on a non-transitory machine-readable medium and/or (2) in a transmission signal) and/or a hardware-implemented module (e.g., processing circuitry configured to implement a module). A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

Figure 6:
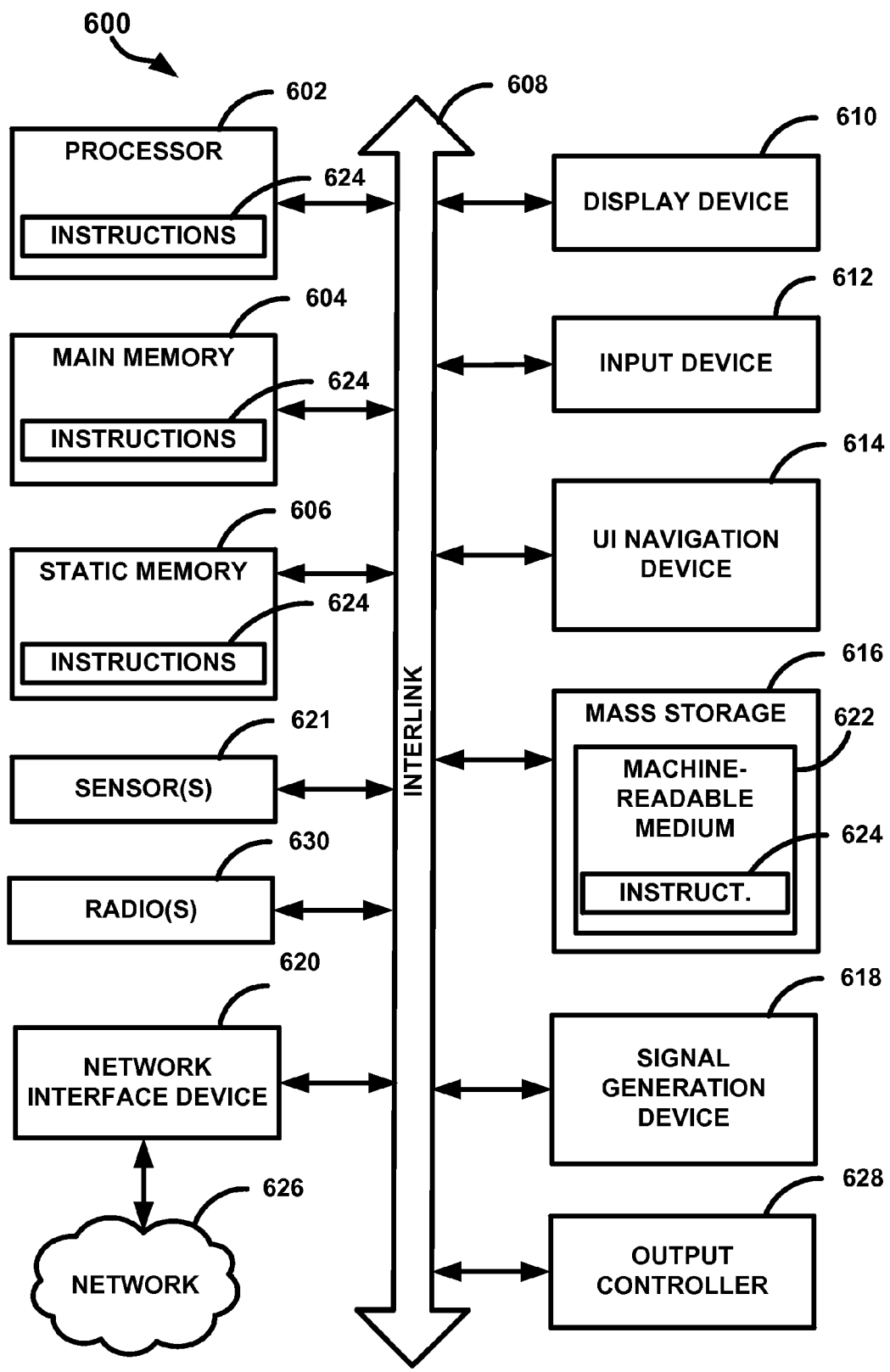
FIG. 6 illustrates, by way of example, a block diagram of a computing device on which one or more of the methods as discussed herein can be implemented, in accord with one or more embodiments.

FIG. 6 illustrates, by way of example, a block diagram of an embodiment of a machine 600 on which one or more of the methods as discussed herein can be implemented. One or more of the wearable device 102, the smart phone 104, the server 106, the database 108, the network 110, the location module 202, the feature extraction module 204, the situation assessment module 206, the modification module 208, the image rendering module 210, the bandwidth assessment module 212, and/or the HLT module 214 can include one or more of the items of the computing device 600. One or more of the wearable device 102, the smart phone 104, the server 106, the database 108, the network 110, the location module 202, the feature extraction module 204, the situation assessment module 206, the modification module 208, the image rendering module 210, the bandwidth assessment module 212, and/or the HLT module 214 can be implemented by the computing device 600. In alternative embodiments, the machine 600 operates as a standalone device or may be connected (e.g., networked) to other machines. In a networked deployment, the machine 600 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The machine 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Examples and Additional Notes

Example 1 can include or use subject matter (such as an apparatus, a method, a means for performing operations, or a machine readable memory including instructions that, when performed by the machine, can configure the machine to perform acts), such as can include or use one or more servers including three dimensional models of objects and features of the objects indexed and stored thereon, processing circuitry communicatively coupled to the server to provide functionality of a plurality of modules comprising: a feature extraction module to extract features of a first object in a field of view of a camera of a wearable device and provide the extracted features to the server, wherein the server is to match the extracted features to features of the three dimensional models of objects near a location of the user and return the three dimensional model of the object that includes features that best match the extracted features, a situation assessment module to assess a situation of a user associated with the wearable device, a modification module to augment the three dimensional model with one or more augmentation objects based on the assessed user situation, and an image rendering module to render an image on the wearable device including the modified three dimensional model.

Example 2 can include or use, or can optionally be combined with the subject matter of Example 1, to include or use, a bandwidth assessment module to assess available compute bandwidth at the wearable device, a smart phone networked to the wearable device, and the server and delegating computer program computation required to modify the three dimensional model to the smart phone, the wearable device, and the server based on the assessed available compute bandwidth.

Example 3 can include or use, or can optionally be combined with the subject matter of at least one of Examples 1-2, to include or use, wherein situation assessment module to assess the situation of the user includes determining if the user is 1) determining their orientation relative to the location; 2) browsing the location; 3) searching for a specific area of interest; or 4) looking for guidance to find the area of interest.

Example 4 can include or use, or can optionally be combined with the subject matter of Example 3, to include or use, wherein the situation assessment module further assesses a buying history and past behavior of the user in determining the user situation.

Example 5 can include or use, or can optionally be combined with the subject matter of Example 3, to include or use, wherein the modification module to modify the three dimensional model based on the user situation includes the modification module to modify the three dimensional model to include different augmented reality objects for each user situation.

Example 6 can include or use, or can optionally be combined with the subject matter of at least one of Examples 1-5, to include or use, wherein the wearable device includes smart glasses or a smart visor.

Example 7 can include or use, or can optionally be combined with the subject matter of at least one of Examples 1-6, to include or use, wherein the modification module is to modify the three dimensional model to include an augmented reality object that indicates where a person the user is interested in finding is located.

Example 8 can include or use, or can optionally be combined with the subject matter of at least one of Examples 1-7, to include or use, wherein the image rendering module is to modify the three dimensional model to include a view of a camera output, wherein the camera includes a field of view of an area that is occluded to the user.

Example 9 can include or use, or can optionally be combined with the subject matter of at least one of Examples 1-8, to include or use, wherein the modification module is further to rotate the three dimensional model of the object to match the orientation of the user relative to the object and adding an augmented reality object to the three dimensional model of the object.

Example 10 can include or use, or can optionally be combined with the subject matter of at least one of Examples 1-9, to include or use, wherein the one or more servers include generally featureless regions on or near objects indexed and stored thereon such that the modification module to determine a location on or around the object on which to situate an augmented reality object that does not obscure the view of the object to the user includes the modification module to look up the generally featureless region in the server.

Example 11 can include or use subject matter (such as an apparatus, a method, a means for performing operations, or a machine readable memory including instructions that, when performed by the machine, can configure the machine to perform acts), such as can include or use extracting, using processing circuitry, features of a location in a field of view of a camera of a wearable device based on the line-of-sight and position of the wearable device, retrieving a three dimensional model of the location based on the extracted features, assessing a situation of a user associated with the wearable device, determining one or more objects in the field of view of the camera that the user is interested in based on the assessed user situation, modifying the three dimensional model based on the assessed user situation and the determined one or more objects, and presenting, using the wearable device, at least a portion of the modified three dimensional model.

Example 12 can include or use, or can optionally be combined with the subject matter of Examples 10, to include or use assessing available compute bandwidth at the wearable device, a smart phone networked to the wearable device, and a server networked to the wearable device, and delegating computer program computation required to modify the three dimensional model to the smart phone, the wearable device, and the server as a function of the available compute bandwidth.

Example 13 can include or use, or can optionally be combined with the subject matter of at least one of Examples 11-12, to include or use, wherein assessing the situation of the user includes determining if the user is 1) determining their orientation relative to the location; 2) browsing the location; 3) searching for a specific area of interest; or 4) looking for guidance to find the area of interest.

Example 14 can include or use, or can optionally be combined with the subject matter of Example 13, to include or use, wherein modifying the three dimensional model based on the user situation includes modifying the three dimensional model to include different augmented reality objects for each user situation.

Example 15 can include or use, or can optionally be combined with the subject matter of at least one of Examples 11-14, to include or use, wherein the wearable device includes smart glasses or a smart visor.

Example 16 can include or use, or can optionally be combined with the subject matter of at least one of Examples 11-15, to include or use, wherein modifying the three dimensional model based on the assessed user situation and the determined one or more objects includes modifying the three dimensional model to include an augmented reality object that indicates where a person the user is interested in finding is located.

Example 17 can include or use, or can optionally be combined with the subject matter of at least one of Examples 11-16, to include or use, wherein modifying the three dimensional model based on the assessed user situation and the determined one or more objects includes modifying the three dimensional model based on the assessed user situation and the determined one or more objects includes modifying the three dimensional model is modified to include a view of a camera output, wherein the camera includes a field of view of an area that is occluded to the user.

Example 18 can include or use, or can optionally be combined with the subject matter of at least one of Examples 11-17, to include or use, wherein extracting features of a location in a field of view of a camera of a wearable device includes extracting edges of an object in the field of the camera, and wherein the method further comprises determining a location of the user and an orientation of the user relative to the object in the field of view of the camera.

Example 19 can include or use, or can optionally be combined with the subject matter of Example 18, wherein retrieving the three dimensional model of the location based on the extracted features includes retrieving a three dimensional model of the object and rotating the three dimensional model of the object to match the orientation of the user relative to the object and adding an augmented reality object to the three dimensional model of the object.

Example 20 can include or use, or can optionally be combined with the subject matter of at least one of Examples 11-19, to include or use, wherein modifying the three dimensional model includes determining a location on or around the object on which to situate an augmented reality object that does not obscure the view of the object to the user includes the modification module by looking up the generally featureless region in a server that includes generally featureless regions indexed and stored thereon.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An augmented reality system comprising:
processing circuitry networked to one or more servers, the one or more servers including three dimensional models of objects and features of the objects indexed and stored thereon, the processing circuitry to provide functionality of a plurality of modules comprising:
a feature extraction module to extract a wire frame of a first object in a field of view of a camera of a wearable device of a user and provide the extracted wire frame to the server, wherein the server is to compare the extracted wire frame to wire frames of the three dimensional models of objects near a location of the user and return a three dimensional model of an object of the three dimensional models of objects that includes wire frame that best matches the extracted wire frame;
a situation assessment module to assess a situation of the user;
a modification module to augment the three dimensional model with one or more augmentation objects based on the assessed user situation; and
an image rendering module to render an image on the wearable device including the modified three dimensional model,
wherein the one or more servers include generally featureless regions on or near objects indexed and stored thereon and the modification module is further to determine a location on or around the object on which to situate an augmented reality object that does not obscure the view of the object to the user includes the modification module to look up the generally featureless region in the server, wherein the generally featureless regions includes less than a threshold number of edges as determined by at least one of a maximally stable extrema regions, Viola-Jones, and speeded up robust features (SURF) operation.

2. The system of claim 1, wherein the plurality of modules further comprise:
a bandwidth assessment module to assess available compute bandwidth at the wearable device, a smart phone networked to the wearable device, and the server and delegate one or more operations to modify the three dimensional model to the smart phone, the wearable device, or the server based on the assessed available compute bandwidth.

3. The system of claim 1, wherein situation assessment module to assess the situation of the user includes determining if the user is 1) determining their orientation relative to the location; 2) browsing the location; 3) searching for a specific area of interest; or 4) looking for guidance to find the area of interest.

4. The system of claim 3, wherein the situation assessment module further assesses a buying history and past behavior of the user in determining the user situation.

5. The system of claim 3, wherein the modification module to modify the three dimensional model based on the user situation includes the modification module to modify the three dimensional model to include different augmented reality objects and different amounts of augmented reality objects for each user situation.

6. The system of claim 1, wherein the wearable device includes smart glasses or a smart visor.

7. The system of claim 1, wherein the modification module is to modify the three dimensional model to include an augmented reality object that indicates where a person the user is interested in finding is located.

8. The system of claim 1, wherein the image rendering module is to modify the three dimensional model to include a view of a camera output, wherein the camera includes a field of view of an area that is occluded to the user.

9. The system of claim 1, wherein the plurality of modules further comprise a location module to determine a geographic location of the user, wherein the modification module is further to rotate the three dimensional model of the object to match the orientation of the user's head relative to the object and add an augmented reality object to the rotated three dimensional model of the object, wherein the orientation of the user's is relative to a cardinal direction determined based on video data from the camera of the wearable device and the location from the location module.

10. A method for augmented reality, the method comprising:

extracting, using processing circuitry, at least one wire frame of a location in a field of view of a camera of a wearable device based on the line-of-sight and position of the camera of the wearable device;

comparing the extracted at least one wire frame to wire frames of three dimensional models of objects near the location;

retrieving, from a server, a three dimensional model of the location based on the comparison, the retrieved three dimensional model including a wire frame that best matches a wire frame of the extracted at least one wire frame;

assessing a situation of a user associated with the wearable device;

determining one or more objects in the field of view of the camera that the user is interested in based on the assessed user situation;

modifying the three dimensional model based on the assessed user situation and the determined one or more objects;

determining a location on or around the object on which an augmented reality object is placed that does not obscure the view of the object to the user by looking up a generally featureless region of the location on or near the object indexed and stored in the server on which to situate an augmented reality object of the augmented reality objects, wherein the generally featureless region includes less than a threshold number of edges as determined by at least one of a maximally stable extrema regions, Viola-Jones, and speeded up robust features (SURF) operation; and presenting, using the wearable device, at least a portion of the modified three dimensional model.

11. The method of claim 10, further comprising:

assessing available compute bandwidth at the wearable device, a smart phone networked to the wearable device, and a server networked to the wearable device; and delegating computer program computation required to modify the three dimensional model to the smart phone, the wearable device, and the server as a function of the available compute bandwidth.

12. The method of claim 10, wherein assessing the situation of the user includes determining if the user is 1) determining their orientation relative to the location; 2) browsing the location; 3) searching for a specific area of interest; or 4) looking for guidance to find the area of interest.

13. The method of claim 12, wherein modifying the three dimensional model based on the user situation includes modifying the three dimensional model to include different augmented reality objects for each user situation.

14. A non-transitory computer readable storage device including instructions stored thereon, the instructions which, when executed by a machine configure the machine to:

extract at least one wire frame of a location in a field of view of a camera of a wearable device;

compare the extracted at least one wire frame to wire frames of three dimensional models of objects near the location;

retrieve, from a server, a three dimensional model of the location based on the extracted at least one wire frame, the retrieved three dimensional model including a wire frame that best matches a wire frame of the extracted at least one wire frame;

assess a situation of a user associated with the wearable device;

modify the three dimensional model based on the assessed user situation;

determine a location on or around the object on which an augmented reality object is placed that does not obscure the view of the object to the user by identifying a generally featureless region of the location on or near the object indexed and stored in the server on which to situate an augmented reality object of the augmented reality objects, wherein the generally featureless region includes less than a threshold number of edges as determined by at least one of a maximally stable extrema regions, Viola-Jones, and speeded up robust features (SURF) operation; and provide data corresponding to at least a portion of the modified three dimensional model to the wearable device.

15. The storage device of claim 14, wherein the instructions for modifying the three dimensional model include instructions, which when executed by the machine, configure the machine to modify the three dimensional model to include an augmented reality object that indicates where a person the user is interested in finding is located.

16. The storage device of claim 14, wherein the instructions for modifying the three dimensional model include instructions, which when executed by the machine, configure the machine to modify the three dimensional model to include a view of a camera output, wherein the camera includes a field of view of an area that is occluded to the user.

17. The storage device of claim 14, wherein the instructions for extracting the at least one wire frame of a location in a field of view of a camera of a wearable device include instructions, which when executed by the machine configure the machine to extract edges of an object in the field of the camera, and wherein the storage device further comprises instructions, which when executed by the machine, configured the machine to determine a location of the user and an orientation of the user relative to the object in the field of view of the camera, and wherein the instructions for retrieving the three dimensional model of the location based on the extracted at least one wire frame include instructions, which when executed by the machine, configure the machine to retrieve a three dimensional model of the object and rotate the three dimensional model of the object to match the orientation of the user relative to the object before adding the augmented reality object to the three dimensional model.

* * * * *